United States Patent [19]

Tsuboyama et al.

[11] Patent Number: 4,674,839
[45] Date of Patent: Jun. 23, 1987

[54] FERROELECTRIC LIQUID CRYSTAL APPARATUS HAVING PROTECTIVE COVER MEANS

[75] Inventors: Akira Tsuboyama, Tokyo; Yutaka Inaba, Kawaguchi; Hiroyuki Kitayama, Tokyo, all of Japan

[73] Assignee: Canon Kabushiki Kaisha, Tokyo, Japan

[21] Appl. No.: 905,140

[22] Filed: Sep. 9, 1986

[30] Foreign Application Priority Data

Sep. 10, 1985 [JP] Japan ................................ 60-198677

[51] Int. Cl.$^4$ ................................................ G02F 1/13
[52] U.S. Cl. .................................... 350/334; 350/337; 350/350 S
[58] Field of Search ...................... 350/334, 337, 350 S

[56] References Cited

U.S. PATENT DOCUMENTS 4,403,831  9/1983  Amano ........................... 350/344 X
4,527,862  7/1985  Arakawa ........................... 350/334

Primary Examiner—John K. Corbin
Assistant Examiner—Richard F. Gallivan
Attorney, Agent, or Firm—Fitzpatrick, Cella, Harper & Scinto

[57] ABSTRACT

The specification and the drawings discloses, in a ferroelectric liquid crystal device used for a liquid crystal display device, a liquid crystal-optical shutter, etc., a technique for stably retaining a desired alignment state for a long period of time to improve display and driving characteristics by providing protection means for protecting the liquid crystal cell from a phenomenon of generating a sanded texture caused by an external force such as an impact applied to the cell.

11 Claims, 9 Drawing Figures

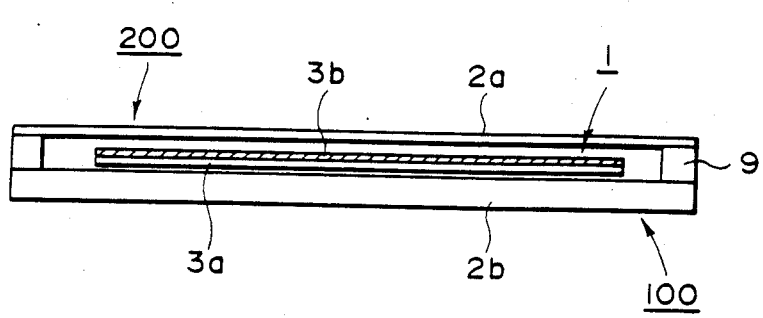
F I G. 1
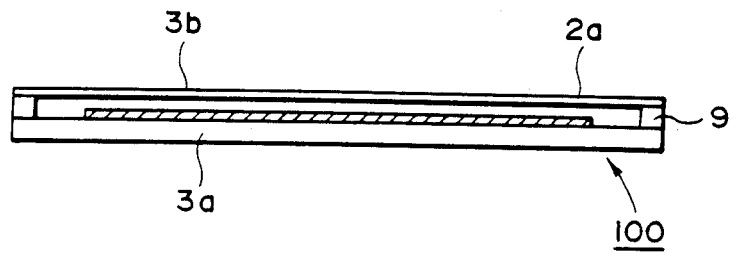
F I G. 2
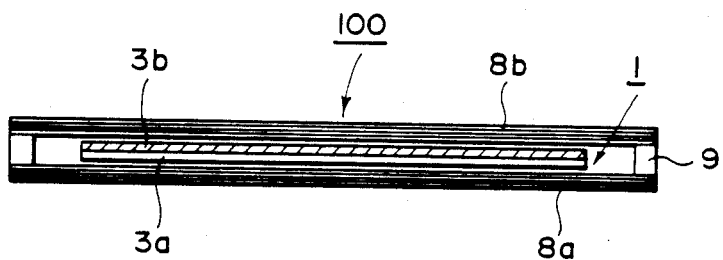
F I G. 3

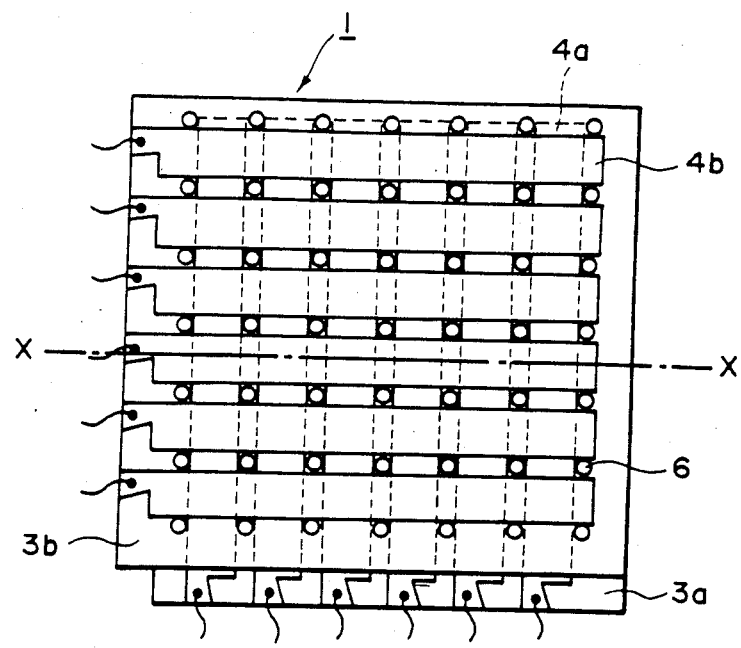
F I G. 4
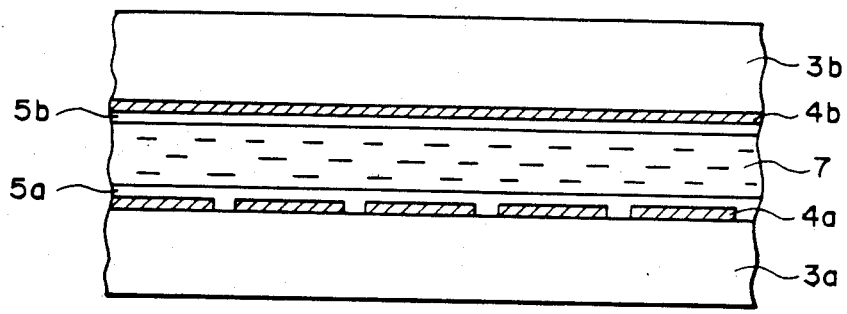
F I G. 5

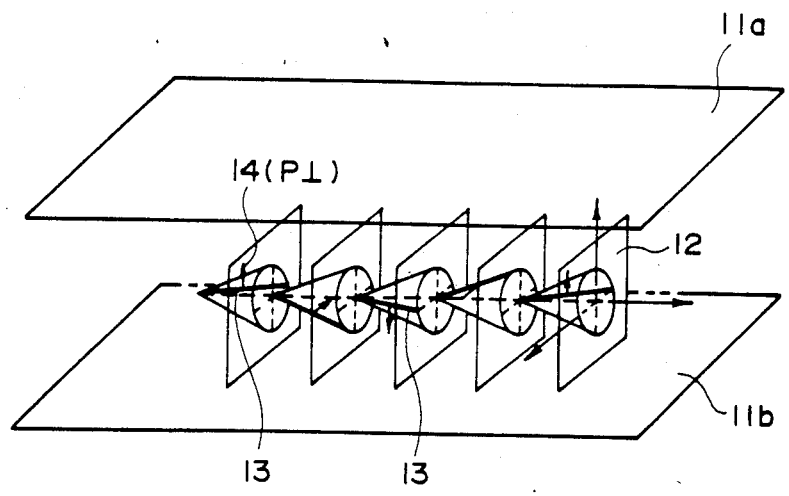
F I G. 6
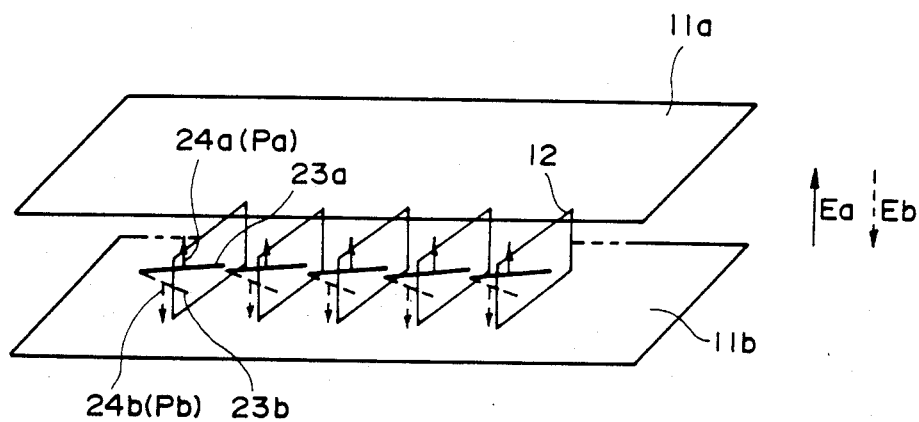
F I G. 7

FERROELECTRIC LIQUID CRYSTAL APPARATUS HAVING PROTECTIVE COVER MEANS

FIELD OF THE INVENTION AND RELATED ART

The present invention relates to a liquid crystal apparatus using a ferroelectric liquid crystal device, particularly a liquid crystal apparatus retaining a proper liquid crystal alignment state while preventing the generation of a sanded texture of a ferroelectric liquid crystal due to an impact applied thereto.

Recently, a ferroelectric liquid crystal is frequently used for a liquid crystal device, a liquid crystal-optical shutter, etc. The liquid crystal assumes a bistable state providing a first optically stable state and a second optically stable state in response to an electric field applied thereto. As a result, different from a conventional TN (twisted nematic)-type liquid crystal, the ferroelectric liquid crystal is oriented to the first optically stable state in response to one field vector and to the second optically stable state in response to the other field vector. Further, this type of liquid crystal very quickly responds to an applied electric field to assume either one of the above two stable states and retains the resultant state in the absence of an electric field.

In this instance, in order that a ferroelectric liquid crystal exhibits a good bistability, it is necessary to form the liquid crystal in a very thin layer of the order of 1 $\mu$m–5 $\mu$m. Especially, in order to form a large panel of, e.g., 12 inch or larger in terms of a diagonal size, it has been practiced to use a flexible substrate of a plastic film or a flexible glass sheet as a substrate for a liquid crystal cell and provide a vacuum chamber in the resultant liquid crystall cell so that the liquid crystal layer can be pressed through the flexible substrate by the atmosphere pressure to form a liquid crystal layer in a uniform thickness corresponding to spacers disposed in the cell.

Liquid crystal molecules constituting the ferroelectric liquid crystal forms a layer structure of a uniform monodomain. We have observed a defect, however, that the layer structure thus formed is liable to be disordered due to a warp of the cell caused by external pressure such as impact, especially a warp of the flexible substrate caused by an impact applied thereto and the liquid crystal once put in disorder cannot be restored to the original ordery state to lose its optical modulation function.

Such a texture change is explained with reference to FIGS. 8 and 9. FIG. 8 is a polarizing microscope picture ($\times 65$) of a ferroelectric liquid crystal under its normal state, wherein white and black portions respectively indicate portions where the liquid crystal molecules are oriented to the respective orientation states. When an external pressure is applied to a cell in this state to warp the cell, the texture of the liquid crystal is disorder into a sanded texture. This phenomenon is liable to be caused with respect to a thin cell of a bistable ferroelectric liquid crystal having released its spiral structure.

SUMMARY OF THE INVENTION

A principal object of the present invention is to provide a liquid crystal apparatus having solved the above problem, particularly a liquid crystal apparatus capable of stably retaining a proper liquid crystal alignment state for a long period of time while preventing the generation of a sanded texture due to applied impact of a ferroelectric liquid crystal.

According to the present invention, there is provided a liquid crystal apparatus, comprising a liquid crystal cell, which comprises a first substrate, a second substrate which is flexible and is disposed oppositely spaced from the first substrate and secured at the periphery to the first substrate to leave an internal space therebetween, and a ferroelectric liquid crystal filled in the internal space, and protection means for protecting the liquid crystal cell from an external force.

The liquid crystal apparatus according to the present invention is characterized by having protection means for protecting a liquid crystal device of a cell structure which comprises a pair of substrates and a ferroelectric liquid crystal sandwiched therebetween. More specifically and preferably, the protection means comprises a polarizing plate, and the ferroelectric liquid crystal has two stable states including a first and a second stable state and is in a smectic phase.

The liquid crystal material most suitably used in the present invention is a chiral smectic liquid crystal having a ferroelectricity. More specifically, a liquid crystal showing a chiral smectic C (SmC*) phase or H (SmH*) phase.

The above described liquid crystal, when supplied with an external impact against the substrate, loses its bistability to result in a sanded or sand-like texture of a ferroelectric liquid crystal, so that its optical modulation function is lost. According to the invention, however, the liquid crystal cell is provided with a protection means for protecting the cell from the external force, so that the externally applied impact is not directly communicated to the cell to prevent the layer structure of the liquid crystal from disordering.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1-3 are respectively a sectional view taken across the thickness of an embodiment of the liquid crystal apparatus according to the present invention;

FIGS. 4 and 5 are a plan view and a sectional view, respectively, of a liquid crystal cell;

FIGS. 6 and 7 are respectively a schematic perspective view of a liquid crystal cell for illustrating the operation principle of a ferroelectric liquid crystal;

DETAILED DESCRIPTION OF PREFERRED EMBODIMENTS

Figure 8:
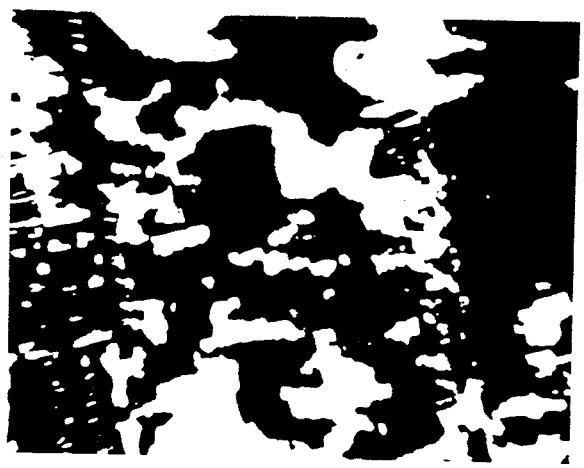
FIGS. 8 and 9 are respectively a picture taken through a polarizing microscope of a texture of a ferroelectric liquid crystal.

FIG. 1 is a sectional view showing a first embodiment of the liquid crystal apparatus. Referring to FIG. 1, a liquid crystal cell 1 comprises an opposite substrate 3a and a display side substrate 3b which is usually thinner than the opposite substrate 3a and comprises a flexible material. On the other hand, the substrate 3a is usually thick and comprises a material not showing flexibility. More specifically, the substrate 3a is ordinarily 2 mm or less in thickness, and the substrate 3b is 2 mm or less, preferably 0.1-1 mm, in thickness. The inside of the liquid crystal cell is filled with a ferroelectric liquid crystal. A liquid crystal apparatus 100 comprises a protective case 200 as a protection means which in turn comprises protective plates 2a and 2b of a transparent material such as glass or an acrylic resin in a thickness of generally 1 mm or more, and the liquid crystal cell 1 disposed between the protective plates, the peripheries of which are sealed with a sealing member 9.

FIG. 2 is a sectional view showing a second embodiment of the present invention. The liquid crystal apparatus 100 shown in FIG. 2 comprises a structure wherein a substrate 3a of a liquid crystal cell is enlarged in area, a protective plate 2a is disposed above the substrate 3a, and the peripheral portions are sealed by a sealing member 9. In this case, the thickness of the apparatus may be made thinner than the liquid crystal apparatus shown in FIG. 1.

FIG. 3 is a sectional view showing a third embodiment of the present invention. In this embodiment, polarizing plates 8a and 8b are used in place of the above mentioned protective plates 2a and 2b. If the polarizing plates are used for the protecting plates 2a and 2b in this way, they can effect both protection of the cell and polarization required for the apparatus, thus avoiding the necessity of using an extensively superposed structure to further simplify the structure. In the above embodiments, the gap or spacing between the flexible substrate 3b and the protective plates 2a or polarizing plate 8b is generally 0.5 mm or more. The upper limit of the gap depends on the area of the liquid crystal cell but may ordinarly 1 cm or less.

FIG. 4 is a plan view of a liquid crystal cell used in the above embodiments, and FIG. 5 is a sectional view taken along the line X—X in FIG. 4. Referring to these figures, the liquid crystal cell 1 comprises substrates 3a and 3b of glass or plastic, stripe electrodes 4a and 4b of 1000 Å-thick ITO (Indium-Tin-Oxide) films respectively formed on the substrates 3a and 3b, and 1000 Å-thick polyimide films 5a and 5b covering the electrodes. Further, 1 μ-dot spacers 6 of polyimide are formed on either one of the polyimide films 5a and 5b for retaining the liquid crystal layer thickness. By these spacers 6, the liquid crystal layer 7 is held at a constant thickness over a wide area.

The ferroelectric liquid crystal material used in this embodiment may for example be a two-component mixture containing two compounds shown by the following formulas:

EXAMPLE 1

Mixture Liquid Crystal A

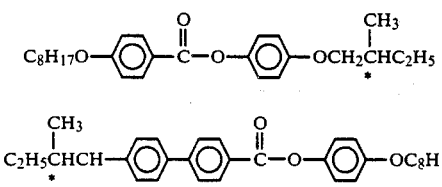

The mixture liquid crystal containing the above compounds 1 and 2 in a ratio of 4:1 shows the following phase transition temperatures (DSC data. °C.):

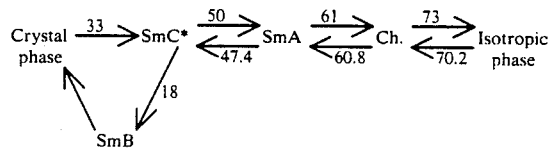

EXAMPLE 2

Mixture Liquid Crystal B

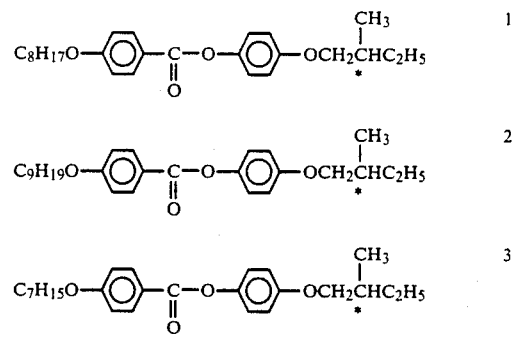

The ferroelectric liquid crystal mixture containing the above compounds in ratios of 3:2:1 shows the following phase transition temperatures (DSC data. °C.):

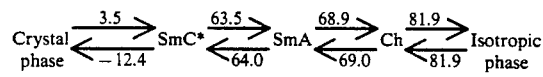

Figure 9:

In a specific example, a liquid crystal cell as shown in FIGS. 4 and 5 was prepared by fixing two substrates subjected to rubbing to form a cell, introducing the above mixture liquid crystal A, heating the cell to a temperature where the liquid crystal layer assumed an isotropic phase, and gradually cooling the cell at a rate of 0.5° C./hr into a temperature ranging providing an SmC* phase. Then, rectangular pulse voltages were applied to respective electrodes 4a and 4b, and the switching of the cell sandwiched between right angle cross nicols was observed through a microscope to examiner the alignment and driving characteristic of the liquid crystal. As a result, it was observed that the alignment was uniform throughout the cell to provide a monodomain over a wide area, and a microscopic state as shown in FIG. 8 was obtained after switching between the two states by applying the voltages between the electrodes. More specifically, a bistable state was realized, and a contrast of 10–12 was obtained between the bright and dark two states under right angle cross nicols, so that it is considered that a uniform layer structure as shown in FIG. 6 was obtained. When an external force such as tapping or pressure application by hand was applied to the glass substrate 3a or 3b to warp the cell, the beautiful monodomain texture was changed into a sanded texture with rough appearance as shown in FIG. 9. In this state, optical response was still observable, but a desired optical modulation could not be effected.

The same phenomenon was observed with a cell in which the above mentioned mixture liquid crystal B was introduced.

The above phenomenon was prevented from occurring by encasing or protecting such a liquid crystal cell 1 with a protective case having protective plates 2a and 2b or a protective case having polarizing plates as shown in FIGS. 1–3. Thus, in order to use a ferroelectric liquid crystal as an optical modulation element, it is necessary to form a uniform layer structure of a monodomain, so that the disposition of protection means provides an important solution to the above problem.

Now, the operation principle of a ferroelectric liquid crystal cell is supplemented.

Referring to FIG. 6, there is schematically shown an example of a ferroelectric liquid crystal cell for explanation of the operation thereof. Reference numerals 11a and 11b denote substrates (glass plates) on which a transparent electrode of, e.g., $In_2O_3$, $SnO_2$, ITO (Indium-Tin-Oxide), etc., is disposed respectively. A liquid crystal of a chiral smectic phase such as SmC* or SmH* in which liquid crystal molecular layers 12 are aligned perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11a and 11b, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than $10\mu$). As the thickness of the liquid crystal layer is decreased in this way, the helical structure of the liquid crystal molecules is unwound or released to provide a non-helical structure even in the absence of an electric field whereby the dipole moment assumes either of the two states, i.e., Pa in an upper direction 24a or Pb in a lower direction 24b as shown in FIG. 7. When electrical field Ea or Eb higher than a certain threshold level and different from each other in polarity as shown in FIG. 7 is applied to a cell having the above-mentioned characteristics, the dipole moment is directed either in the upper direction 24a or in the lower direction 24b depending on the ventor of the electric field Ea or Eb. In correspondence with this, the liquid crystal molecules are oriented to either a first stable state 23a or a second stable state 23b.

When the above-mentioned ferroelectric liquid crystal is used as an optical modulation element, it is possible to obtain two advantages as briefly mentioned hereinbefore. First is that the response speed is quite fast. Second is that the orientation of the liquid crystal shows bistability. The second advantage will be further explained, e.g., with reference to FIG. 7. When the electric field Ea is applied to the liquid crystal molecules, they are oriented to the first stable state 23a. This state is stably retained even if the electric field is removed. On the other hand, when the electric field Eb of which direction is opposite to that of the electric field Ea is applied thereto, the liquid crystal molecules are oriented to the second stable state 23b, whereby the directions of molecules are changed. This state is similarly retained stably even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible. It is especially desirable to make the cell thickness small when a display device of a large picture area is prepared.

As described hereinabove, there is provided a ferroelectric liquid crystal device retaining a desired alignment stably for a long period of time and showing a proper driving characteristic by disposing a protection means. It is also possible to use as a protection means a protective plate which is also used as a polarizing plate to show the effect of reducing the possibility of breakage of a glass substrate.

What is claimed is:

1. A liquid crystal apparatus, comprising:
   a liquid crystal cell, which comprises a first substrate, a second substrate which is flexible on application of an external force and is disposed oppositely spaced from the first substrate and secured at the periphery to the first substrate to leave an internal space therebetween, and a ferroelectric liquid crystal filled in the internal space; and
   protection means for protecting the liquid crystal cell from an external force.

2. A liquid crystal apparatus according to claim 1, wherein said protection means comprises a transparent plate which is disposed opposite to said second substrate with a gap therebetween.

3. A liquid crystal apparatus according to claim 1, wherein said protection means comprises a hollow case in which the liquid crystal cell is enclosed, said hollow case comprising two transparent plates, one of which is disposed opposite to said second substrate with a gap therebetween.

4. A liquid crystal apparatus according to claim 1, wherein said protection means comprises a case including the first substrate and one transparent plate which is disposed opposite to said second substrate with a gap therebetween.

5. A liquid crystal apparatus according to claim 1, wherein said protection means comprises a polarizing plate which is disposed opposite to said second substrate with a gap therebetween.

6. A liquid crystal apparatus according to claim 1, wherein said protection means comprises a hollow case in which the liquid crystal cell is enclosed, said hollow case comprising two polarizing plates, one of which is disposed opposite to said second substrate with a gap therebetween.

7. A liquid crystal apparatus according to claim 1, wherein said second substrate comprises a flexible glass sheet.

8. A liquid crystal apparatus according to claim 1, wherein said second substrate comprises a flexible plastic sheet.

9. A liquid crystal apparatus according to claim 1, wherein said ferroelectric liquid crystal is a chiral smectic liquid crystal.

10. A liquid crystal apparatus according to claim 9, wherein said chiral smectic liquid crystal is formed in a layer thin enough to release the spiral structure.

11. A liquid crystal apparatus according to claim 1, wherein said first substrate comprises a non-flexible glass plate.

* * * * *

UNITED STATES PATENT AND TRADEMARK OFFICE
CERTIFICATE OF CORRECTION

PATENT NO. : 4,674,839
DATED : June 23, 1987
INVENTOR(S) : AKIRA TSUBOYAMA, ET AL.

It is certified that error appears in the above-identified patent and that said Letters Patent is hereby corrected as shown below:

COLUMN 1

Line 36, "crystall" should read --crystal--.
    Lines 37-38, "atmosphere" should read --atmospheric--.
    Line 49, "ordery" should read --ordered--.
    Line 59, "disorder" should read --disordered.--.

COLUMN 3

Line 30, "plates" should read --plate--.
    Line 33, "oridinarly" should read --ordinarily be--.

COLUMN 4

Lines 24-25, " 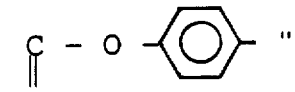 " should read

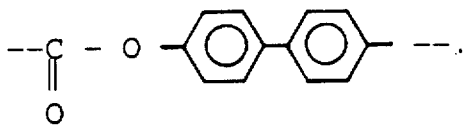

Line 42, "ranging" should read --range--.
    Line 47, "examiner" should read --examine--.

UNITED STATES PATENT AND TRADEMARK OFFICE
CERTIFICATE OF CORRECTION

PATENT NO. : 4,674,839

DATED : June 23, 1987

INVENTOR(S) : AKIRA TSUBOYAMA, ET AL.

It is certified that error appears in the above-identified patent and that said Letters Patent is hereby corrected as shown below:

COLUMN 5

Line 53, "ventor" should read --vector--.

Signed and Sealed this

First Day of March, 1988

Attest:

DONALD J. QUIGG

Attesting Officer      Commissioner of Patents and Trademarks